Nov. 10, 1970

W. J. EVERS ET AL  3,539,565

METHOD FOR PRODUCING A SOLUTION OF CYANURIC CHLORIDE FROM GASEOUS CYANURIC CHLORIDE

Filed Jan. 29, 1968  3 Sheets-Sheet 1

INVENTORS
WILLIAM J. EVERS
PHILIP G. McCRACKEN

BY Wenderoth, Lind & Ponack
ATTORNEYS

United States Patent Office 3,539,565
Patented Nov. 10, 1970

3,539,565
METHOD FOR PRODUCING A SOLUTION OF CYANURIC CHLORIDE FROM GASEOUS CYANURIC CHLORIDE
William J. Evers and Philip G. McCracken, Mobile, Ala., assignors to Geigy Chemical Corporation, Ardsley, N.Y.
Continuation-in-part of application Ser. No. 616,877, Feb. 17, 1967. This application Jan. 29, 1968, Ser. No. 701,352
Int. Cl. B01d 11/04, 3/34; C07d 15/42
U.S. Cl. 260—248                                                                 6 Claims

ABSTRACT OF THE DISCLOSURE

Gaseous cyanuric chloride from a trimerizer is passed into a condenser where it is condensed to a liquid and the condensate is held at an elevated temperature in a pot while the gases are flashed off. Thereafter, the liquid is absorbed in a first solvent in a primary absorption system. The flashed off gases are contacted with a different solvent, the materials other than cyanuric chloride are removed from the solution, and the cyanuric chloride is then transferred to the first solvent and the resulting solution mixed with the solution in the primary absorption system.

---

This application is a continuation-in-part of application Ser. No. 616,877, filed Feb. 17, 1967, now abandoned.

BACKGROUND OF THE INVENTION

Field of the invention

This invention relates to a method and apparatus for the production of cyanuric chloride, and more particularly it relates to the production of cynauric chloride in liquid form in a solvent.

Cyanuric chloride is useful as an intermediate for the manufacture of many products, such as chemotherapeutic agents, herbicides, dyes, brightening agents, synthetic resins, plastics, rubber, explosives and other materials.

DESCRIPTION OF THE PRIOR ART

A presently used commercial process of preparing cyanuric chloride is described in U.S. Pat. No. 3,256,070 in the name of Elwood Bruce Trickey. In this process, vaporous cyanuric chloride is charged into a rotating ball mill. Water is poured over drum of the mill and the temperature lowered to below the desublimation temperature. The vapor desublimes and is comminuted at the same time and the cyanuric chloride is discharged as a white powder. By maintaining the proper rate of feed of the vapor, the temperature and conditions in the drum, a high output of cyanuric chloride is obtained in the form of the finely divided solid material.

Although this is satisfactory as far as it goes, the material is rather difficult to handle in that it is quite toxic and special precautions must be taken in packing and storing it, and in that in feeding it to a further process, for example for making a herbicide, it must be fed batchwise, or at the very best, as a stream of powder. Manifestly, this is rather difficult to control accurately, except by accurately weighing the batch of material before feeding starts. Such a system does not, unfortunately, lend itself very well to automated production.

It is desirable in order to permit use of cyanuric chloride in an automated production system to have it in a liquid form. The most practical liquid form is a solution of cyanuric chloride in a solvent therefor because liquid cyanuric chloride must be maintained at an exact elevated temperature or it will solidify. Moreover, in order to eliminate the dual steps of first desublimating the cyanuric chloride to a solid state and then dissolving it in a solvent, it is desirable to pass it more or less directly from the gaseous state into the solvent where it dissolves and forms the desired solution.

However, when the cyanuric chloride comes from the trimerizer in which it has been converted from cyanogen chloride, there is mixed with it not only untrimerized cyanogen chloride, but also chlorine gas. If this mixture is passed directly into a solvent, such as toluene, it is very likely that there will be an undesired reaction between at least the chlorine and the solvent.

SUMMARY OF THE INVENTION

It is an object of the present invention to provide a method of producing a solution of cyanuric chloride from a mixture of gaseous cyanuric chloride, cyanogen chloride, chlorine, and other gaseous by-products of the reaction in a series of steps which do not include desublimating the cyanuric chloride.

Another object of the invention is to provide a method of recovering cyanuric chloride in a solvent from the gases in the condensing means.

A further object of the invention is to provide an apparatus for carrying out the method of the invention.

The method of the invention comprises first condensing the cyanuric chloride to its liquid form, flashing off the chlorine and cyanogen chloride remaining in the liquid, and then absorbing the liquid cyanuric chloride in the solvent. The gases flashed off the condensed cyanuric chloride are then absorbed separately, the unwanted materials are removed from the solution, and the cyanuric chloride remaining is transferred to the same solvent as that in which the liquid cyanuric chloride is dissolved. Alternatively, the gases flashed off can be further trimerized and then treated in the same way. The apparatus for carrying out the method comprises a condenser which takes the output of the trimerizer and condenses it, and a pot for holding the condensed cyanuric chloride at a particular temperature while the gases are flashed off. The apparatus further comprises a first absorber in which the liquid cyanuric chloride is absorbed in a solvent, and either a secondary absorber, stripper and solvent transfer means for absorbing the gases flashed off, or a scavenger trimerizer and a second absorber, stripper and solvent transfer means.

BRIEF DESCRIPTION OF THE FIGURES

The invention will be described in connection with the accompanying drawings, in which.

DESCRIPTION OF THE PREFERRED EMBODIMENTS

Figure 1:
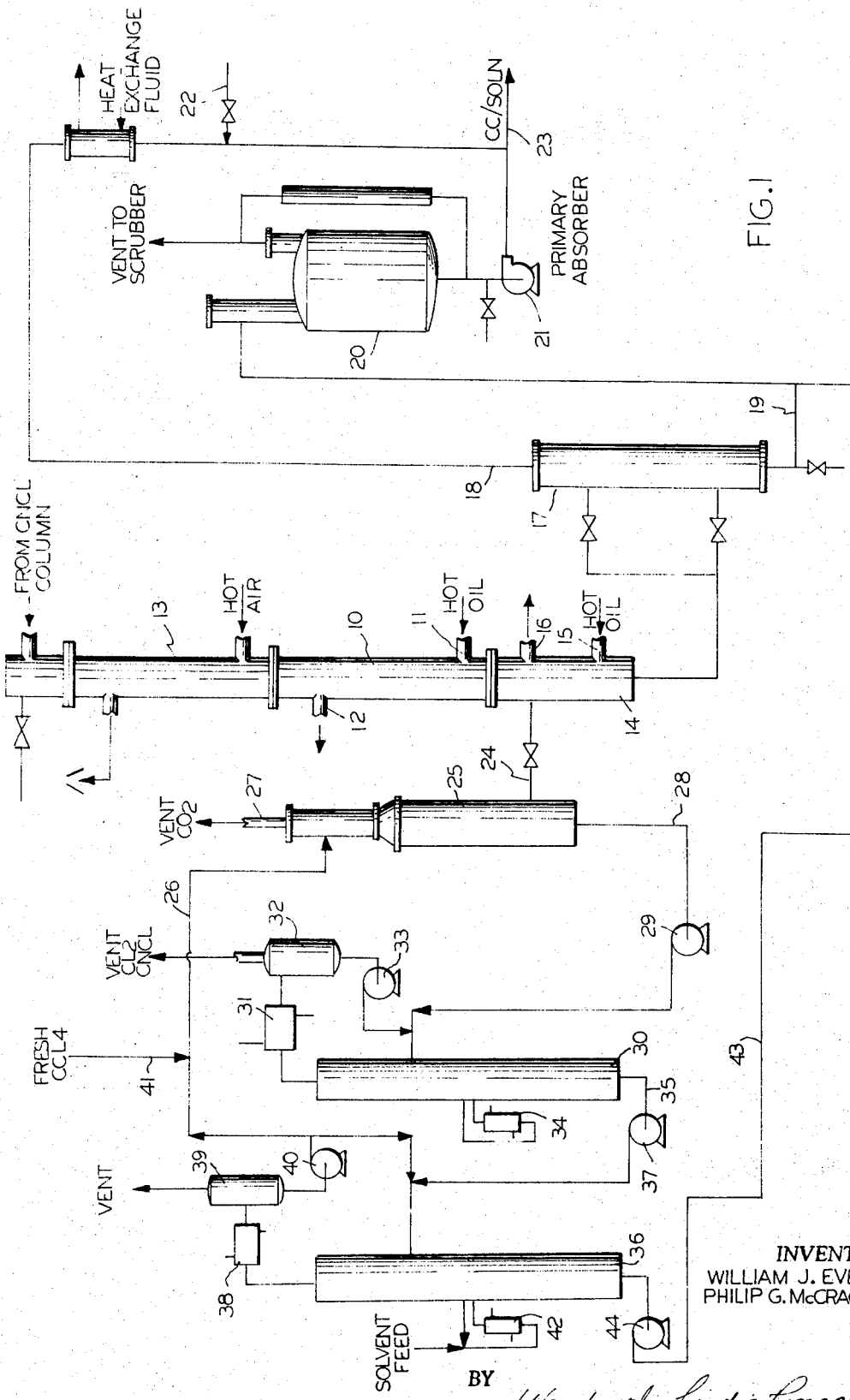
FIG. 1 is a schematic representation of an apparatus for carrying out the method of the invention and in which the gases flashed off the condensed cyanuric chloride are absorbed in a secondary absorption system.

Referring to FIG. 1, one apparatus for carrying out the method of the invention comprises a condenser 10 having an inlet 11 and an outlet 12 for circulating a heat exchange fluid therethrough. The upper end of the condenser 10 is shown as coupled directly to a trimerizer 13, but it is not essential that it be directly coupled. The output from the trimerizer can be fed to the condenser through a piping system. The trimerizer 13 is fed from the apparatus for producing cyanogen chloride. At the bottom of the condenser is a pot 14 having a jacket therearound with an inlet 15 and an outlet 16 for a heat exchange fluid. From the bottom of the pot 14 a conduit leads to a first absorption tower 17 in a primary absorption system which has a solvent inlet line 18 at the top thereof and a solution outlet line 19 at the bottom thereof. The lines 18 and 19 extend to a solvent-solution storage tank 20. A pump 21 is provided in the solvent inlet line, and a fresh solvent inlet 22 is also provided in this line, and a cyanuric chloride solution tap 23 is also included in this line.

A gas takeoff line 24 extends from the top of the pot 14 to a secondary absorption tower 25 in a secondary absorption system. The top of the secondary absorption tower 25 has a supply line 26 connected thereto for supplying a solvent thereto and has a vent 27. The bottom of the secondary absorption tower 25 has a withdrawal line 28 connected thereto which is connected through a pump 29 to the top of a stripper column 30. The top of the stripper column 30 has a line extending to a solvent condenser 31 and then to a solvent reflux drum 32, the bottom of the drum being connected through a solvent pump 33 to the line 28 where it feeds into the column 30. A stripper reboiler 34 is connected to the stripper column. The bottom of the stripper column 30 has line 35 extending to a solvent transfer column 36 through a stripper bottom pump 37. A line from the top of the solvent transfer column 36 extends to a vented transfer column reflux drum 39 through a heat exchanger 38, and the drum 39 is connected to the line 35 where it is connected to the solvent transfer column through a pump 40, and is also connected to the solvent supply line 26 for feeding solvent to the top of absorption tower 25. A fresh solvent inlet 41 is provided in the line 26. A transfer column reboiler 42 is connected to the solvent transfer column 36 and a solvent feed line has one branch connected thereto. A second branch extends directly into said transfer column. A line 43 extends from the bottom of the solvent transfer column 36 through a pump 44 to the solvent solution storage tank 20.

In operation, cyanogen chloride is fed into the trimerizer 13 and hot gas, e.g., hot air, is fed through the heating jacket thereof. The trimerized cyanogen chloride, i.e., cyanuric chloride, passes from the bottom of the trimerizer into the condenser 10, in which the temperature is maintained near the condensation temperature of the cyanuric chloride, preferably about 150° C., by means of a heat exchange fluid, such as hot oil, which is passed through the heating jacket thereof through the inlet 11 and outlet 12. The condensate from the condenser 10 collects in the heated pot 14 where it is maintained at the temperature of the liquid by means of a heat exchange fluid passed through the jacket thereof through the inlet 15 and outlet 16. The temperature of the liquid is preferably from about 145–170° C. The cyanogen chloride gas, the chlorine gas, and any cyanuric chloride which evaporates are passed through the takeoff line 24.

The liquid cyanuric chloride from the pot 14 is passed into the first absorption tower 17 where it is absorbed in solvent pumped through the inlet line 18 by the pump 21 from the storage tank 20, and then returned to the storage tank. Fresh solvent is added from time to time through the inlet 22, and the solution of cyanuric chloride in the solvent is tapped from the tap 23. It is preferred to use a solvent which will absorb a relatively high proportion of cyanuric chloride so that the size of the equipment can be kept to a minimum. One satisfactory solvent is toluene and another is monochlorobenzene.

The off gases from the condenser 10 are passed by the takeoff line 24 into a secondary recovery system. There is a sufficient proportion of the cyanogen chloride left in these gases to make it economically necessary to recover it. However, there are certain problems in the recovery which make it necessary to use a system which is more than just another absorber. Because of the presence of a rather large proportion of chlorine in these off-gases, it is not desirable to contact them directly with a solvent such as toluene, because reaction products are produced which, while they can be handled in the further treatment of the cyanuric chloride, must eventually be separated out and disposed of. It is contemplated to produce large amounts of cyanuric chloride, and although the proportion of these byproducts is small from a percentage standpoint, the actual physical quantity will be quite large, and this will present a serious disposal problem.

Accordingly, the solvent fed into the secondary absorption tower 25 is carbon tetrachloride, a solvent with which the gases in the mixture of gases will not react, yet which can absorb the gases. The carbon tetrachloride absorbs the cyanuric chloride, chlorine and cyanogen chloride in the off gases, and also absorbs a certain amount of $CO_2$ which is present due to a hydrolysis reaction in the formation of cyanogen chloride. The remainder of the $CO_2$ and other undissolved gaseous reaction products and impurities, such as nitrogen, pass off through the vent 27 at the top of the secondary absorption tower. It has been found that the amount of $CO_2$ thus purged is sufficient so that the remainder of the $CO_2$ which is absorbed by the solvent can by cycled through the secondary recovery system without any adverse effects. This will produce a very favorable condition which will be described hereinafter.

The solution of the carbon tetrachloride with the off gases absorbed therein is passed by the pump 29 through the line 28 to the top of the stripper column 30. In this column the chlorine and cyanogen chloride are stripped from the solution. The solution is heated by passing it through the reboiler 34, which can be heated by steam, for example, and the chlorine and cyanogen chloride are driven off the top of the column through a condenser 31 to a reflux tank 32. In the condenser, any carbon tetrachloride which may have vaporized is condensed and it collects in the reflux tank 32, while the gaseous chlorine and cyanogen chloride pass off through the vent.

The gaseous chlorine and cyanogen chloride which is stripped from the solution are substantially free of $CO_2$ and other gaseous impurities, such as nitrogen, having been purged from the system in the absorption tower 25. Therefore, the gaseous chlorine and cyanogen chloride can be mixed with fresh chlorine and fed directly to a stripping column (not shown) for stripping the gases from the hydrochloric acid which comes from the bottom of the reactor for producing the cyanogen chloride. The gases strip chlorine and cyanogen chloride from the hydrochloric acid and are then fed directly to the reactor as reaction medium. Because the excess $CO_2$ and other impurities have been purged, it is unnecessary to provide for a separate purging step between the stripper column 30 and the reaction apparatus, and the stripping in the stripping column 30 can be carried out at a pressure such that no separate pump means is necessary for pumping the gases to the hydrochloric acid stripping column.

Condensed solvent from the reflux drum 32 is pumped back into the stream of solvent being fed to the stripping column 30 through the line 28.

The carbon tetrachloride, which now has substantially only cyanuric chloride dissolved in it, the other gases being dissolved only in unobjectionable amounts, is pumped out of the bottom of the stripper column 30 through the line 35 by the pump 37.

While the carbon tetrachloride will absorb the cyanuric chloride in the presence of chlorine without forming undesired reaction products, the solubility of the cyanuric chloride in the carbon tetrachloride is relatively low, and the size of equipment necessary to process the solution to react the cyanuric chloride further would therefore have to be relatively large. It is, therefore, necessary to transfer the cyanuric chloride from the carbon tetrachloride solution to a solution of a solvent which is more highly absorbent and which is the same as the solvent used in the primary absorption system. To this end, the solution from the stripper column 30 is fed into the top of the solvent transfer column 36 wherein it is transferred from the carbon tetrachloride to the same solvent used in the primary absorption system. The other solvent is preferably toluene, but monochlorobenzene can also be used with good results. The other solvent is fed into the lower part of the transfer column after being heated in a reboiler 42, a part of the solution in the transfer column also being recycled through the reboiler 42 to heat it. Alternatively, the other solvent can be fed directly into the column, this arrangement not being shown. In the transfer column, the cyanuric chloride will be absorbed in the less volatile and more highly absorbent toluene, or monochlorobenzene, while the carbon tetrachloride will be vaporized. The vapor passes off through a condenser 38 in which most of it is condensed, and it is collected in a reflux tank 39. Carbon tetrachloride can be pumped from the tank 39 by the pump 40 through the supply line 26 to the top of the secondary absorption tower 25. The fresh solvent inlet joins the line 26.

It must be understood that the solvent to which the cyanric chloride is transferred must be more absorbent than the solvent from which the cyanuric chloride is being transferred. Thus, in the present application, the preferred solvents are carbon tetrachloride and toluene, cyanuric tetrachloride. Likewise, the solvent from which the cyanuric chloride is being transferred should be such that it can be readily separated from the solution of the cyanuric chloride in the second solvent. In the preferred case, the carbon tetrachloride can be easily vaporized and separated by driving off the vapor.

The solution of cyanuric chloride in toluene or monochlorobenzene is pumped from the bottom of the transfer column 36 by a pump 44 and to the storage tank 20 which contains the solution of toluene or monochlorobenezene and cyanuric chloride formed in the primary absorption system.

All of the elements used in the apparatus are more or less conventional, being modified only slightly where necessary to take into account the particular materials being handled and the particular conditions under which they must operate. For example, the secondary absorption tower 25 can be a tower partially packed with shapes such as rings or saddles, and the stripper column 30 can be a tower, the upper portion of which is packed with shapes such as rings or saddles and having the upper and lower portions separated by a perforated plate. The transfer column can have the upper section a perforated plate column and the lower section open. All of the parts of the apparatus must, of course, be made of material resistant to the corrosive materials being handled and of material which will be able to withstand the temperatures and pressures at which the apparatus is operated. In order to provide a fuller understanding of the invention, an example will be given.

EXAMPLE 1

An apparatus as shown in FIG. 1 was operated to trimerize cyanogen chloride to cyanuric chloride and then condense it, flash off the gases therein, and then mix the liquid cyanuric chloride in a solvent. The trimerizer was heated with a heat transfer medium, Dowtherm, a product of Dow Chemical Co., to 300° C., the hot air being passed from the outlet in the trimerizer jacket to a stack or vent. The condenser was heated with hot oil so as to be maintained at a temperature of 160° C. The solvent used in the primary absorption system was toluene and that in the secondary system was carbon tetrachloride.

Figure 3:
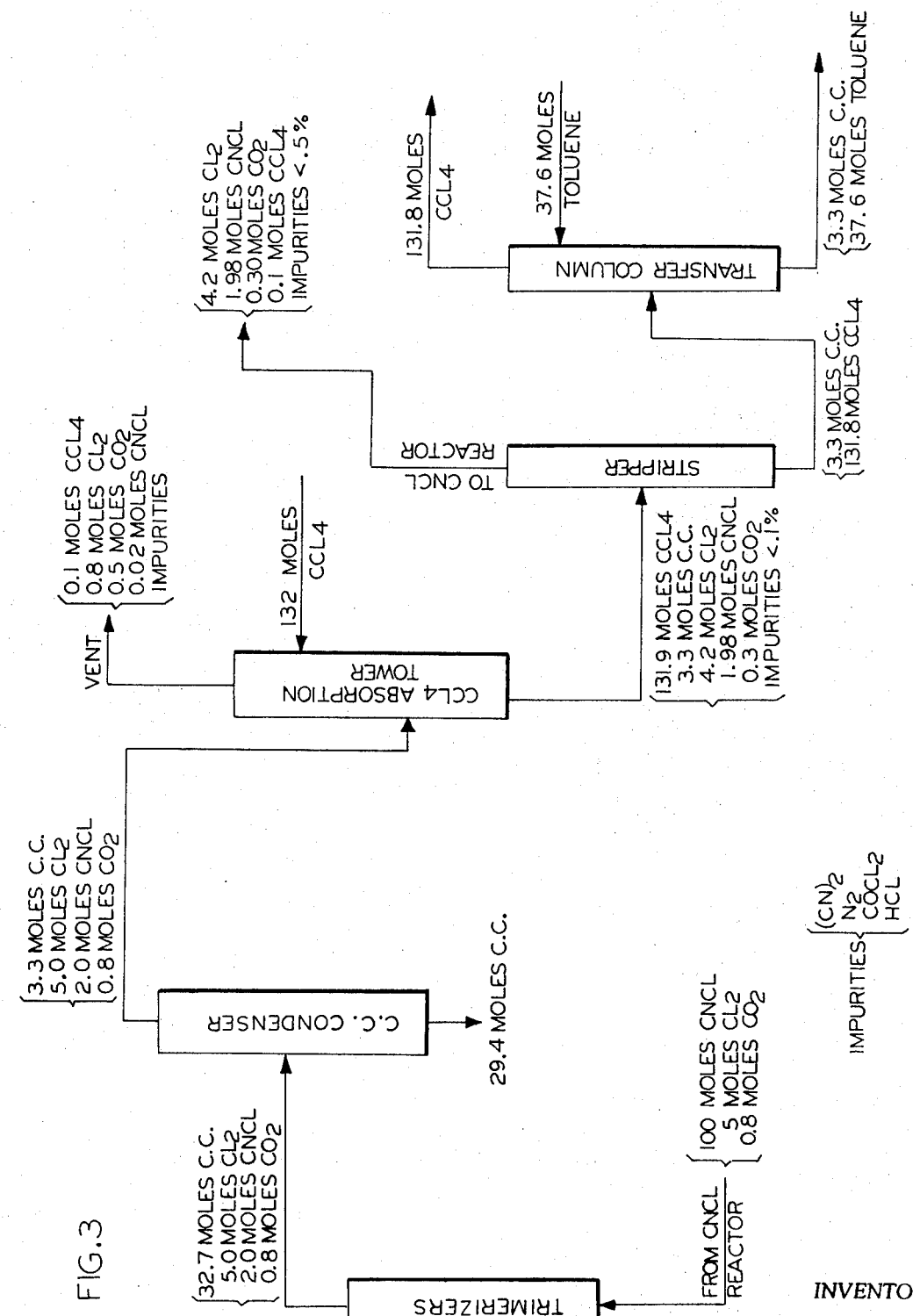
FIG. 3 is a diagram showing material flow through the apparatus of FIG. 1.

As shown in FIG. 3, when there is fed into the trimerizer 100 moles of cyanogen chloride along with 5 moles of chlorine and 0.8 mole of $CO_2$, from the trimerizer there is fed to the condenser 32.2 moles of cyanuric chloride, 5 moles of chlorine, 2 moles of unreacted cyanogen chloride and 0.8 mole of $CO_2$. This gas is at a temperature of about 360° C. In the condenser 29.4 moles of cyanuric chloride are condensed to liquid at a temperature of about 150° C. and absorbed in toluene in the primary absorption system as described in connection with FIG. 1. The gases flashed off the condenser contain 3.3 moles of cyanuric chloride, the 5 moles of chlorine, 2 moles of cyanogen chloride, and the 0.8 mole of $CO_2$, and are at about 150° C. and at a pressure only slightly above atmospheric. This gas is passed into the absorption tower at a temperature of about 150° C. and 132 moles of carbon tetrachloride is fed to the absorption tower in liquid form. The 3.3 moles of cyanuric chloride is absorbed in 131.9 moles of carbon tetrachloride, along with 4.2 moles of chlorine, 1.98 moles of cyanogen chloride and 0.3 mole of $CO_2$, the absorption tower being operated at a temperature of 20–50° C. and a pressure slightly above atmospheric, while there is purged from the top of the absorption tower a mixture of gas having 0.1 mole carbon tetrachloride, 0.8 mole chlorine, 0.5 mole $CO_2$, and 0.2 mole cyanogen chloride. The amount of $CO_2$ is the excess over and above the 0.3 mole which can be recycled through the present system without any detrimental effects on the reactions.

The solution from the bottom of the absorption tower is fed to the stripper column at a temperature of 20–50° C., and heat is supplied through the reboiler in an amount sufficient to raise the temperature enough to strip all but the cyanuric chloride from the carbon tetrachloride. Only 0.1 mole of solvent are driven off with the other gases, while substantially all of the other gases are driven off. The column is operated at a pressure of about 20 p.s.i.g. and the gases driven off the top are at about 100° C. The solution from the bottom of the stripper column is fed to the transfer column at a temperature of about 110° C. and there is also fed thereto 37.6 moles of toluene heated to a temperature of about 120° C. by the reboiler. All of the carbon tetrachloride is driven off at about 76° C. and recovered and recycled to the absorption tower, while the 3.3 moles of cyanuric chloride dissolved in the 37.6 moles of toluene are withdrawn from the bottom of the transfer column at about 120° C. and fed to the stream of liquid cyanuric chloride which comes from the condenser and is dissolved in toluene. The transfer column is operated at about atmospheric pressure.

In an actual pilot plant operation at these temperatures and pressures, about .76 lb. mole per hour of cyanogen chloride were fed into the trimerizer.

Figure 2:
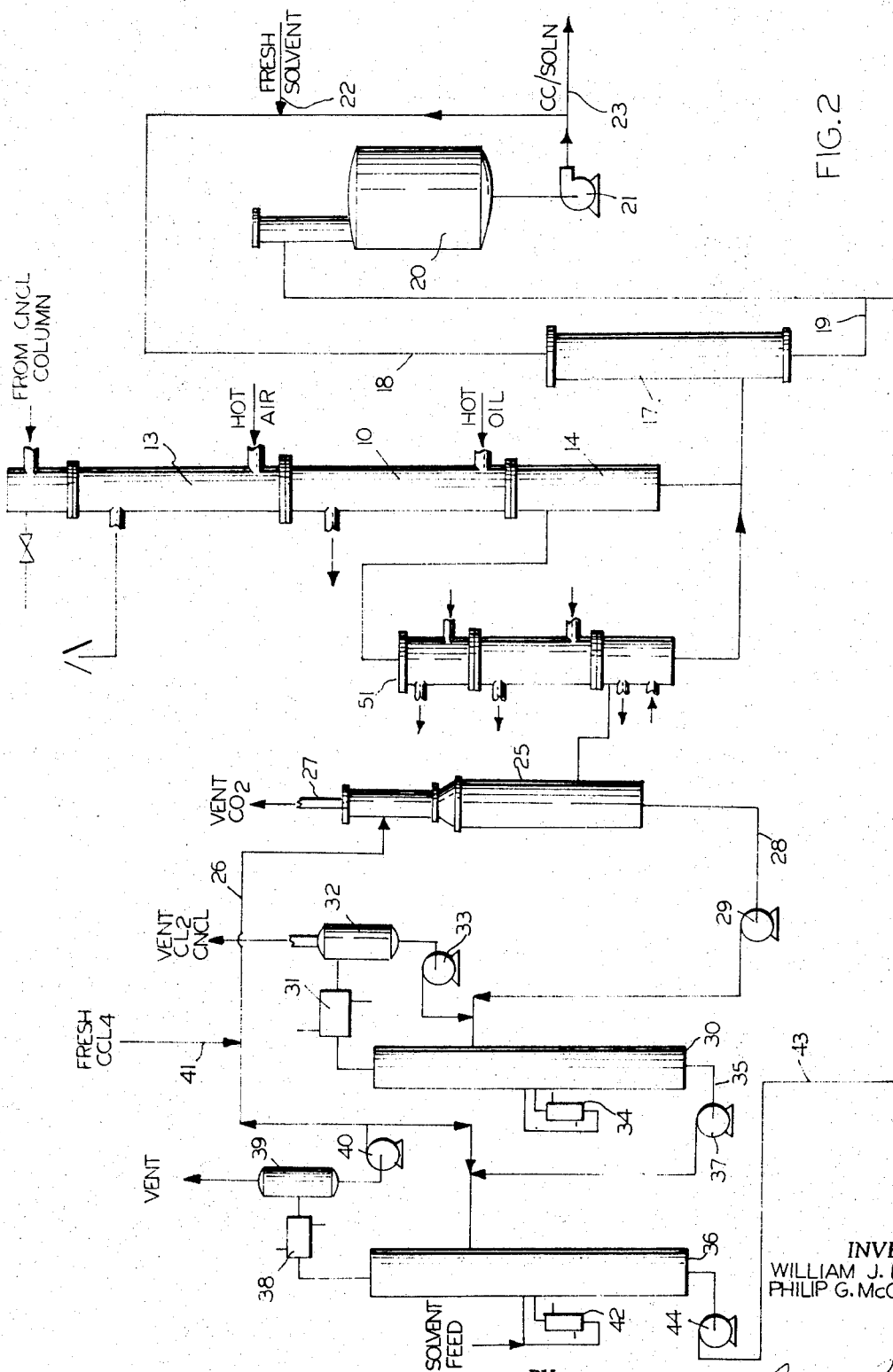
FIG. 2 is a schematic representation of an apparatus similar to that of FIG. 1, but having a scavenger trimerizer and a secondary absorption system.

It is also possible to take the gases flashed off the liquid cyanuric chloride in the pot 14 and pass them through a scavenger before passing them through the secondary absorption system. Such an arrangement is shown schematically in FIG. 2, in which the apparatus is the same as that of FIG. 1 in that a trimerizer 13, condenser 10 with a pot 14, and a first absorption system having an absorption tower 17, storage tank 20 and conduits 18 and 19, and pump 21 are provided. The outlet 24 for the gases flashed from the liquid cyanuric chloride in the pot 14 leads to a scavenger trimerizer 51, the gases from which go to the secondary absorption tower 25, which is the first element of a secondary absorption system which is the same as the secondary absorption system for the apparatus of FIG. 1, and contains a second absorption tower 25, etc. The condensed cyanuric chloride goes to the absorption tower 17. The operation of the apparatus of FIG. 2 is essentially similar to that of FIG. 1, the scavenger trimerizer and second condenser being operated at essentially the same conditions as the primary trimerizer, condenser and pot.

There has thus been provided apparatus and a method which is carried out in the apparatus in which cyanuric chloride is taken from the gaseous condition to a solution without it being passed through the solid stage. The steps of the method insure that the gases of cyanogen chloride, chlorine and gaseous cyanuric chloride are removed from the liquid cyanuric chloride before it is absorbed in the solvent. The method is relatively easy to carry out and produces good yields of cyanuric chloride relative to the yield which could be expected theoretically.

It is thought that the invention and its advantages will be understood from the foregoing description and it is apparent that various changes may be made in the form, construction and arrangements of the parts without departing from the spirit and scope of the invention or sacrificing its material advantages, the forms hereinbefore described and illustrated in the drawings being merely preferred embodiments thereof.

What is claimed is:

1. A method of producing a solution of cyanuric chloride from a gaseous mixture containing cyanuric chloride, comprising the steps of condensing at about 150° C. the cyanuric chloride in said mixture to a liquid, holding the cyanuric chloride in liquid form at a temperature of from about 145 to about 170° C. for a time sufficient to flash off any gases of chlorine, cyanogen chloride and gaseous cyanuric chloride dissolved in said liquid, dissolving said liquified cyanuric chloride in a first organic solvent which will absorb a relatively high proportion of cyanuric chloride, to form a first cyanuric chloride containing solution, absorbing the flashed-off gases in a second organic solvent with which the flashed-off gases will not react, said second solvent being more volatile than said first solvent and less highly absorbent of cyanuric chloride than the first solvent, stripping the solution of absorbed off gases in said second solvent to remove substantially all the dissolved off-gases except the cyanuric chloride, contacting the solution of cyanuric chloride in the second solvent remaining after said stripping with said first solvent at a temperature which will vaporize said second solvent to form a second cyanuric chloride containing solution and combining the first and second cyanuric chloric solutions.

2. A method as claimed in claim 1 in which said first solvent in which the liquid cyanuric chloride is dissolved is toluene and said second solvent is carbon tetrachloride.

3. A method as claimed in claim 1 in which said first solvent in which the liquid cyanuric chloride is dissolved is monochlorobenzene and said second solvent is carbon tetrachloride.

4. A method as claimed in claim 1 further including the step of trimerizing the cyanogen chloride in the flashed off gases prior to absorbing them in said second solvent.

5. A method of producing a solution of cyanuric chloride from gaseous cyanuric chloride in an apparatus including a condenser, a pot below the condenser, a primary absorption system to which said pot is coupled, a secondary absorption system, and a gas conduit from the pot to the said second absorption system, comprising the steps of passing gaseous cyanuric chloride into said condenser while holding the condenser at the condensation temperature of the cyanuric chloride, collecting the condensate in said pot and holding it in liquid form at a temperature of from about 145 to about 170° C., flashing off the gases in said liquid held in the pot, passing the liquid from the pot into the primary absorption system, absorbing the liquid into a first organic solvent which absorb a relatively high proportion of cyanuric chloride in said primary absorption system, to form a first cyanuric chloride containing solution, passing the flashed off gases through the gas conduit into the secondary absorption system and absorbing them in a second organic solvent with which the flashed-off gases will not react, the second solvent being more volatile than said first solvent and less highly absorbent of cyanuric chloride than said first solvent, stripping the flashed-off gases other than cyanuric chloride from the solution of the gases in the second solvent, contacting the solution of cyanuric chloride in said second solvent remaining after said stripping with said first solvent at a temperature which will vaporize said second solvent to form a second cyanuric chloride containing solution, and combining the first and second cyanuric chloride containing solutions.

6. In a method of producing a solution of cyanuric chloride in a solvent therefor including the steps of reacting hydrogen cyanide and chlorine to produce cyanogen chloride, trimerizing the cyanogen chloride to produce a gaseous mixture containing cyanuric chloride, condensing the gaseous cyanuric chloride from said mixture to form a liquid, maintaining the cyanuric chloride in liquid form at a temperature of from about 145 to about 170° C. for a time sufficient to flash off any gases from said mixture, and absorbing said liquid cyanuric chloride in a first organic solvent which will absorb a relatively high proportion of cyanuric chloride to form a first cyanuric chloride containing solution, the improvement comprising absorbing the flashed-off gases in a second organic solvent with which the flashed-off gases will not react, said second solvent being more volatile than said first solvent and less highly absorbent of cyanuric chloride than said first solvent, and during said absorbing step simultaneously purging undissolved gases, stripping the chlorine and cyanogen chloride from the solution of flashed-off gases in the second solvent, leaving substantially only cyanuric chloride left in the second solvent, feeding the stripped chlorine and cyanogen chloride back to the reaction step of reacting hydrogen cyanide and chlorine, contacting the solution of cyanuric chloride in said second solvent remaining after said stripping with said first solvent at a temperature whch will vaporize said second solvent to produce a second cyanuric chloride containing solution, and combining the first and second cyanuric chloride containing solutions.

References Cited
UNITED STATES PATENTS

| | | | |
|---|---|---|---|
| 2,416,656 | 2/1947 | Thurston | 260—248 |
| 2,417,659 | 3/1947 | Oldham | 260—248 |
| 2,692,880 | 10/1954 | Cofrancesco | 260—248 |
| 2,762,798 | 9/1956 | Hardwicke | 260—248 |
| 2,838,512 | 6/1958 | Teyseire | 260—248 |
| 3,070,601 | 12/1962 | Johnson | 260—248 |
| 3,141,882 | 7/1964 | Franz | 260—248 |
| 3,312,697 | 4/1967 | Reithmann | 260—248 |
| 3,338,898 | 8/1967 | Foulletier | 260—248 |

NORMAN YUDKOFF, Primary Examiner

S. J. EMERY, Assistant Examiner

U.S. Cl. X.R.

23—312, 294; 203—50